United States Patent [19]
Lee et al.

[11] Patent Number: 5,805,828
[45] Date of Patent: Sep. 8, 1998

[54] METHOD AND APPARATUS FOR AN AVIONICS SYSTEM UTILIZING BOTH ARINC 429 AND ARINC 629 COMPLIANT SYSTEMS

[75] Inventors: Stephen Y. Lee, Seattle; Jeffrey K. Drake, Kent; Greg J. Sherwin, Renton; Derek E. Deloe, Auburn, all of Wash.

[73] Assignee: The Boeing Company, Seattle, Wash.

[21] Appl. No.: 710,448

[22] Filed: Sep. 17, 1996

Related U.S. Application Data

[60] Provisional application No. 60/017,873 May 14, 1996.
[51] Int. Cl.⁶ .............................. G06F 13/00; G06F 13/38
[52] U.S. Cl. ...................... 395/200.79; 395/308; 370/402
[58] Field of Search ........................... 395/200.8, 200.79, 395/200.76, 281, 306, 308, 309, 311; 370/402, 462, 463

[56] References Cited

U.S. PATENT DOCUMENTS 4,280,221  7/1981  Chun et al. .
5,111,450  5/1992  Cooledge et al. .
5,167,020  11/1992  Kahn et al. .
5,198,700  3/1993  Whiteside .

FOREIGN PATENT DOCUMENTS

0 584 940  3/1994  European Pat. Off. .
0 637 156  2/1995  European Pat. Off. .

*Primary Examiner*—Mark H. Rinehart
*Attorney, Agent, or Firm*—James P. Hamley

[57] ABSTRACT

An aircraft avionics system utilizes ARINC 429 compliant equipment, connected to one or more ARINC 429 data buses, and ARINC 629 equipment, coupled to one or more ARINC 629 data buses. Communication between the ARINC 429 and ARINC 629 equipment is facilitated by a data conversion gateway function (DCGF) system. The DCGF transforms ARINC 429 signals on one ARINC 429 bus for transmission over a second ARINC 429 bus, or over one or more ARINC 629 buses. The DCGF also transforms ARINC 629 signals on one ARINC 629 bus for transmission over a second ARINC 629 bus, or over one or more ARINC 429 buses.

32 Claims, 3 Drawing Sheets

METHOD AND APPARATUS FOR AN AVIONICS SYSTEM UTILIZING BOTH ARINC 429 AND ARINC 629 COMPLIANT SYSTEMS

PRIORITY STATEMENT

This application is based upon, and claims full priority benefits of, U.S. Provisional application Ser. No. 60/017,873 filed May 14, 1996.

BACKGROUND OF THE INVENTION

The present invention relates to the aircraft avionics art and, in particular, to a method and apparatus for permitting communication between ARINC 429 and ARINC 629 systems.

Modern commercial aircraft employ a significant number of various avionics systems. These systems are normally provided by a number of suppliers. Information from one such system must be passed successfully to another, so that the systems operate with a specified protocol over one or more data buses.

In order to provide uniformity and interchangeability among various avionics systems, and to assure proper operation over common data buses, the Aeronautical Radio, Inc. (ARINC) has adopted certain standards. Two such standards are ARINC 429 and ARINC 629. The detailed specifications for ARINC 429 and ARINC 629 are hereby incorporated in this application by reference.

Avionics systems used in present day commercial aircraft generally comply with one of the two ARINC standards, i.e., ARINC 429 or ARINC 629. Given the large number of avionics systems employed on modern commercial aircraft, it is desirable that a mix of both ARINC 429 and ARINC 629 compatible avionics systems could be accommodated. However, due to differences in the protocols, a mix of ARINC 429 and ARINC 629 equipment has not heretofore been proved entirely feasible.

SUMMARY OF THE INVENTION

It is an objective of the present invention, therefore, to provide an aircraft avionics system which is operable with both ARINC 429 and ARINC 629 compatible equipment.

Briefly, according to the invention, an aircraft avionics system which utilizes both ARINC 429 and ARINC 629 equipment includes an ARINC 429 compliant data bus. At least one ARINC 429 compliant avionics system is coupled to the ARINC 429 bus. Also provided is an ARINC 629 compliant data bus, with at least one ARINC 629 compliant avionics system coupled to the ARINC 629 bus. A data conversion gateway function (DCGF) system includes logic which converts the signal produced by the ARINC 429 compliant avionics system on the ARINC 429 data bus for transmission over the ARINC 629 data bus to the ARINC 629 compliant avionics system.

In a further aspect of the present invention, an aircraft avionics system as described above is provided wherein the DCGF system logic further comprises a means for converting a signal produced by the ARINC 629 compliant avionics system on the ARINC 629 data bus for transmission over the ARINC 429 data bus to the ARINC 429 compliant avionics system.

In yet a further aspect of the above described invention, a second ARINC 429 compliant data bus is provided with at least one ARINC 429 compliant avionics system coupled to the second ARINC 429 data bus. The DCGF system logic further comprises a means for converting a signal produced by at least one ARINC 429 compliant avionics system on the ARINC 429 data bus for transmission over the second ARINC 429 data bus to at least one ARINC 429 system coupled thereto.

In an aircraft avionics system utilizing ARINC standard 429 and 629 compliant equipment, a method for providing communication among such equipment comprises the first step of providing an ARINC 429 compliant data bus.

In a further aspect of the above method, the DCGF logic further performs the step of converting a signal produced by the ARINC 629 compliant avionics system on the ARINC 629 data bus for transmission over the ARINC 429 data bus to the ARINC 429 compliant avionics system.

In yet a further aspect of the above method, a second ARINC 629 compliant data bus is provided. Also provided is at least one ARINC 629 compliant avionics system coupled to the second ARINC 629 data bus. The DCGF system logic further performs the step of converting a signal produced by said at least one ARINC 629 compliant avionics system on the ARINC 629 data bus for transmission over the second ARINC 629 data bus to the at least one ARINC 629 system coupled thereto.

In yet a further aspect of the above method, a second ARINC 429 compliant data bus is provided. Also provided is at least one ARINC 429 compliant avionics system coupled to the second ARINC 429 data bus. The DCGF system logic further performs the step of converting a signal produced by the at least one ARINC 429 compliant avionics system on the ARINC 429 data bus for transmission over the second ARINC 429 data bus to the at least one ARINC 429 system coupled thereto.

DETAILED DESCRIPTION

Figure 1:
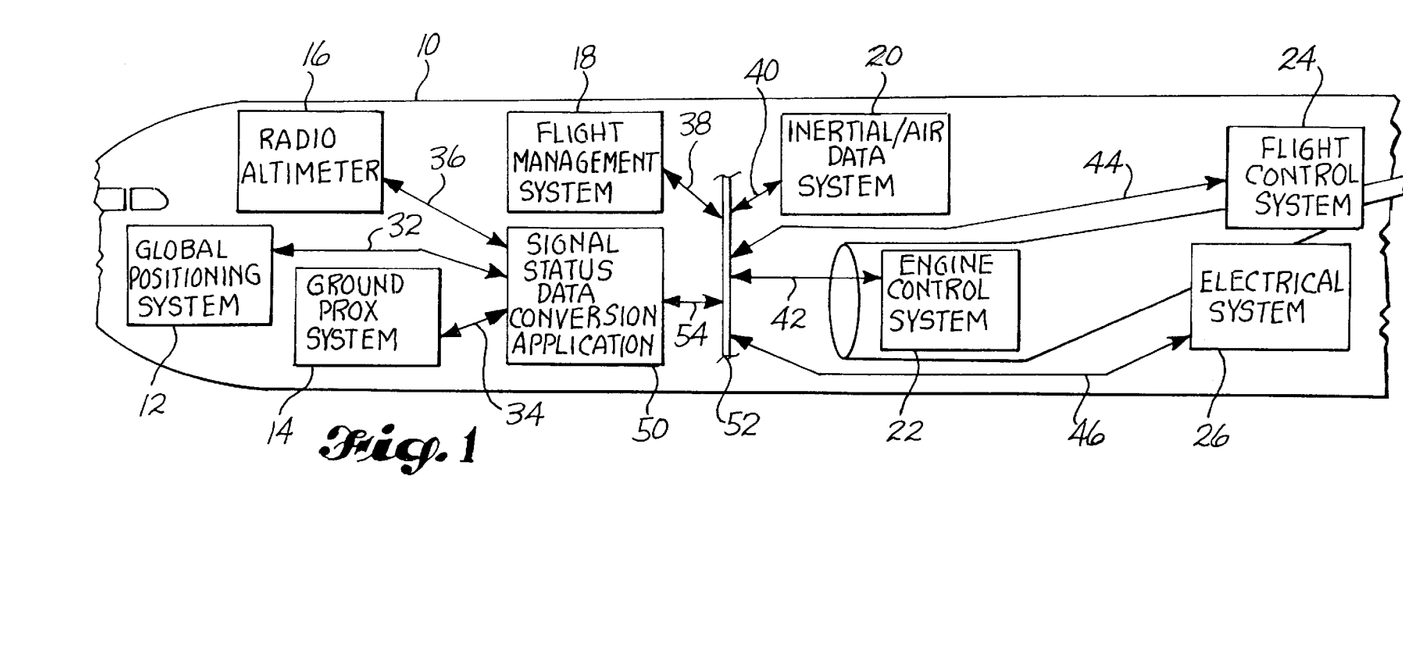
FIG. 1 is a cross sectional profile of a modern commercial aircraft illustrating the use of numerous ARINC 429 and ARINC 629 compliant systems, and their data bus interconnections.

FIG. 1 is a cross sectional, profile view of a modern commercial aircraft, indicated generally at 10. Shown as being onboard the aircraft 10 are a series of both ARINC 429 and ARINC 629 compliant avionics systems. For example, as shown in FIG. 1, the ARINC 429 compliant systems include: a global positioning system 12, a ground proximity warning system 14, and a radio altimeter 16.

The ARINC 629 avionics equipment includes: a flight management system 18, an inertial/air data system 20, an engine control system 22, a flight control system 24, and an electrical system 26. It should be understood that many other types of avionics systems could be included within the aircraft 10.

The global positioning system 12 operates over its ARINC 429 compliant data bus 32, the ground proximity warning system 14 operates over its ARINC 429 compliant data bus 34, and the radio altimeter 16 operates over its ARINC 429 compliant data bus 36.

Flight management system 18 operates over its ARINC 629 compliant data bus 38, inertial/air data system 20 operates over its ARINC 629 compliant data bus 40, engine control system 22 operates over its ARINC 629 compliant data bus 42, flight control system 24 operates over its ARINC 629 compliant data bus 44, and electrical system 26 operates over its ARINC 629 compliant data bus 46.

Note that although the terms "line" and "bus" are used in this description, ARINC 629 systems are configured as a "bus" with "stubs". Thus, item 52 is a "bus", and items 38, 40, 42, and 54 are "stubs" to the bus.

A data conversion gateway function 50 operates to allow communication from one ARINC 429 system to another, from one ARINC 629 system to another, and provides intercommunication capability between ARINC 429 and ARINC 629 systems.

In particular, each of the three ARINC 429 data buses 32, 34, and 36, connect to the data conversion gateway function 50.

Each of the ARINC 629 compliant data buses (or "stubs") 38, 40, 42, 44, and 46 connects to a common ARINC 629 data bus 52, which in turn connects via bus 54 to the data conversion gateway function 50. In the manner described below with respect to FIGS. 2 and 3, the data conversion gateway function 50 allows communication among ARINC 429 to ARINC 429, ARINC 429 to ARINC 629, ARINC 629 to ARINC 429, and ARINC 629 to ARINC 629 systems.

Figure 2:
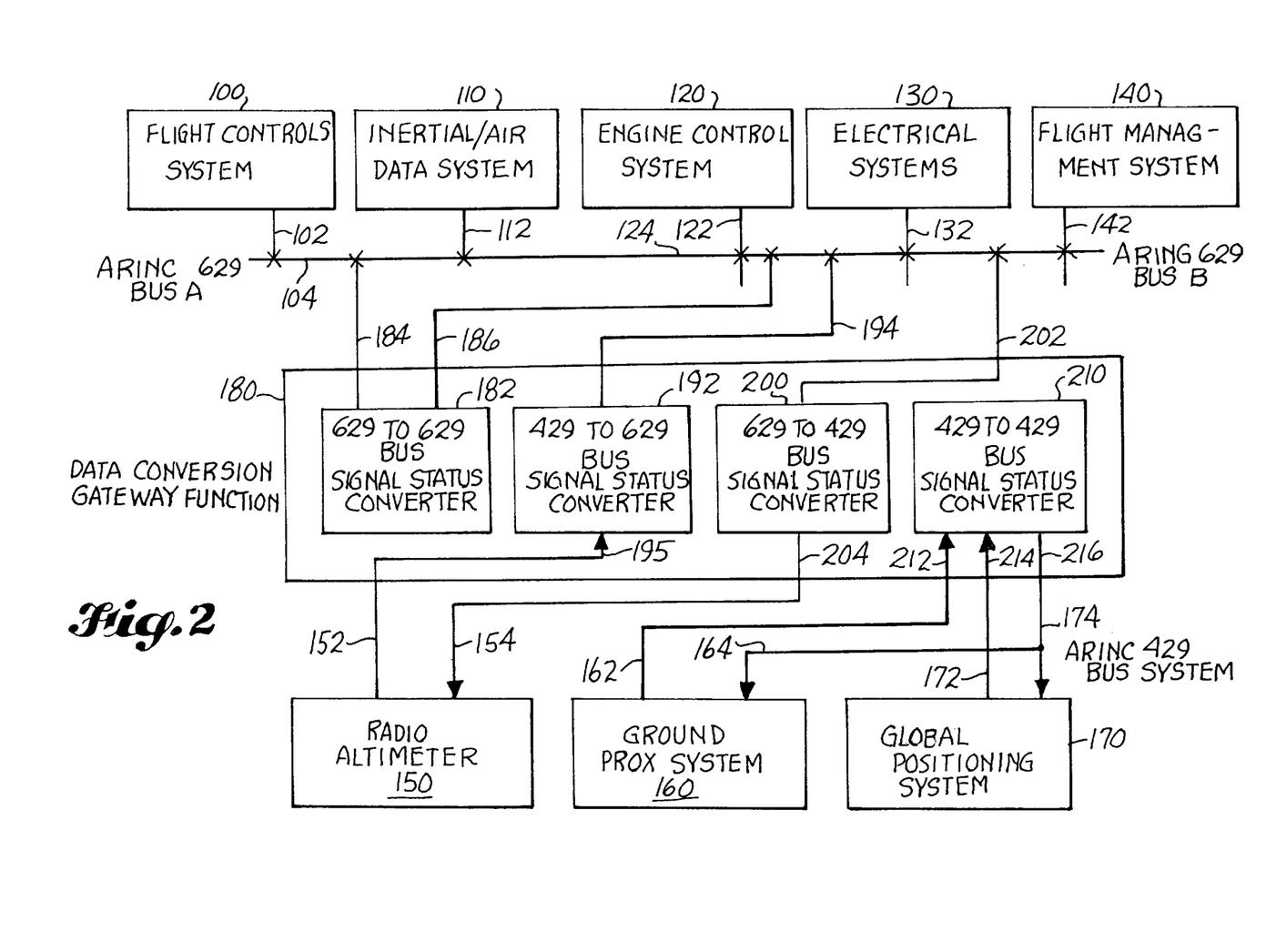
FIG. 2 is a block diagram illustrating the various ARINC 429 and ARINC 629 systems as shown in FIG. 1, and the connection of those systems to corresponding ARINC 429 and ARINC 629 data buses, along with the signal status data conversion system according to the present invention; and, FIG. 3 is a logic flow diagram illustrating the sequence of logical steps performed by the present data conversion system to allow intercommunication between ARINC 429 and ARINC 629 equipment, as well as communication between two different ARINC 629 or ARINC 429 compliant data buses.

FIG. 2 is a schematic diagram illustrating various ARINC 429 avionics systems connected to their associated ARINC 429 data buses, ARINC 629 systems connected to their associated ARINC 629 compliant data buses, and the data conversion gateway function system which allows intercommunication among the various systems.

In particular, shown is an ARINC 629 compliant flight control system 100, which connects via an ARINC 629 compliant line 102 to a first ARINC 629 compliant data bus 104, here also designated Bus A. Also connected to ARINC 629 compliant data bus 104 is an ARINC inertial/air data system 110, which connects to ARINC 629 bus 104 over a line 112.

An ARINC 629 compliant engine control system 120 connects over a line 122 to a second ARINC 629 compliant data bus 124, also denoted as Bus B. An ARINC 629 compliant electrical systems unit 130 connects over a line 132 to the second ARINC 629 compliant data bus 124.

An ARINC 629 compliant flight management system 140 connects over a line 142 also to the second ARINC 629 bus 124.

An ARINC 429 compliant radio altimeter 150 connects to an output ARINC 429 compliant bus 152 and also to an input ARINC 429 data bus 154.

An ARINC 429 compliant ground proximity warning system 160 connects to an output ARINC 429 compliant data bus 162 and an input ARINC 429 compliant data bus 164.

An ARINC 429 compliant global positioning system 170 connects to an output ARINC 429 compliant data bus 172 and an input ARINC 429 compliant data bus 174.

Providing a means to interconnect the various systems as shown in FIG. 2 is a data conversion gateway function 180. The data conversion gateway function includes an internal ARINC 629 to ARINC 629 bus signal status converter 182.

The ARINC 629 to ARINC 629 bus signal status converter 182 has a first line 184 which connects to the first ARINC 629 bus 104, and a second line 186 which connects to the second ARINC 629 bus 124.

Also provided in the data conversion gateway function 180 is an ARINC 429 to ARINC 629 bus signal status converter 192. The ARINC 429 to ARINC 629 bus signal status converter 192 has an output ARINC 629 compliant line 194 which connects to the second ARINC 629 data bus 124 and an input ARINC 429 compliant line 195 which connects to the output line 152 from the radio altimeter 150.

Also provided in the data conversion gateway function system 180 is an ARINC 629 to ARINC 429 bus signal status converter 200. This ARINC 629 to ARINC 429 bus signal status converter 200 includes an ARINC 629 compliant line 202 which connects to the second ARINC 629 compliant data bus 124 and an ARINC 429 compliant line 204, which connects to the radio altimeter input line 154.

Finally, also provided in the data conversion gateway function system 180 is an ARINC 429 to ARINC 429 bus signal status converter 210. The ARINC 429 to ARINC 429 bus signal status converter 210 includes an ARINC 429 compliant input line 212 which couples to the ground proximity warning system 160 output line 162. Also provided as an input ARINC 429 compliant line to ARINC 429 to ARINC 429 bus signal status converter 210 is a line 214 which connects to the output line 172 from the global positioning system 170. In addition, an ARINC 429 compliant output line 216 from the ARINC 429 to ARINC 429 bus signal status converter 210 connects to the ARINC 429 input line 174 of the global positioning system 170 and the input line 164 to the ground proximity system 160.

The ARINC 629 to ARINC 629 bus signal status converter 182 operates in the manner described in detail below to convert signals appearing on one of the first and second ARINC 629 data buses 104, 124, and apply them to the other ARINC 629 data bus for transmittal to the avionics systems coupled thereto.

The ARINC 429 to ARINC 629 bus signal status converter 192 operates, in the manner described more fully herein below, to pass signals which originate on the ARINC 429 data bus line 152 and converts them to ARINC 629 compliant signals for transmission over the ARINC 629 line 194 to the second ARINC 629 compliant data bus 124.

The ARINC 629 to ARINC 429 bus signal status converter 200 operates to pass signals received from the ARINC 629 second data bus 124 to an ARINC 429 compliant format for transmission over the lines 204, 154 to the radio altimeter.

Finally, the ARINC 429 to ARINC 429 bus signal status converter 210 operates to process signals received over lines 162, 212 from the ARINC 429 compliant ground proximity system, and from the ARINC 429 compliant global positioning system 170 over lines 172, 214, to re-send these signals as appropriate ARINC 429 compliant signals to both the ground proximity system 160 over ARINC line 164 and to the global positioning system 170 over the ARINC 429 line 174.

Figure 3:
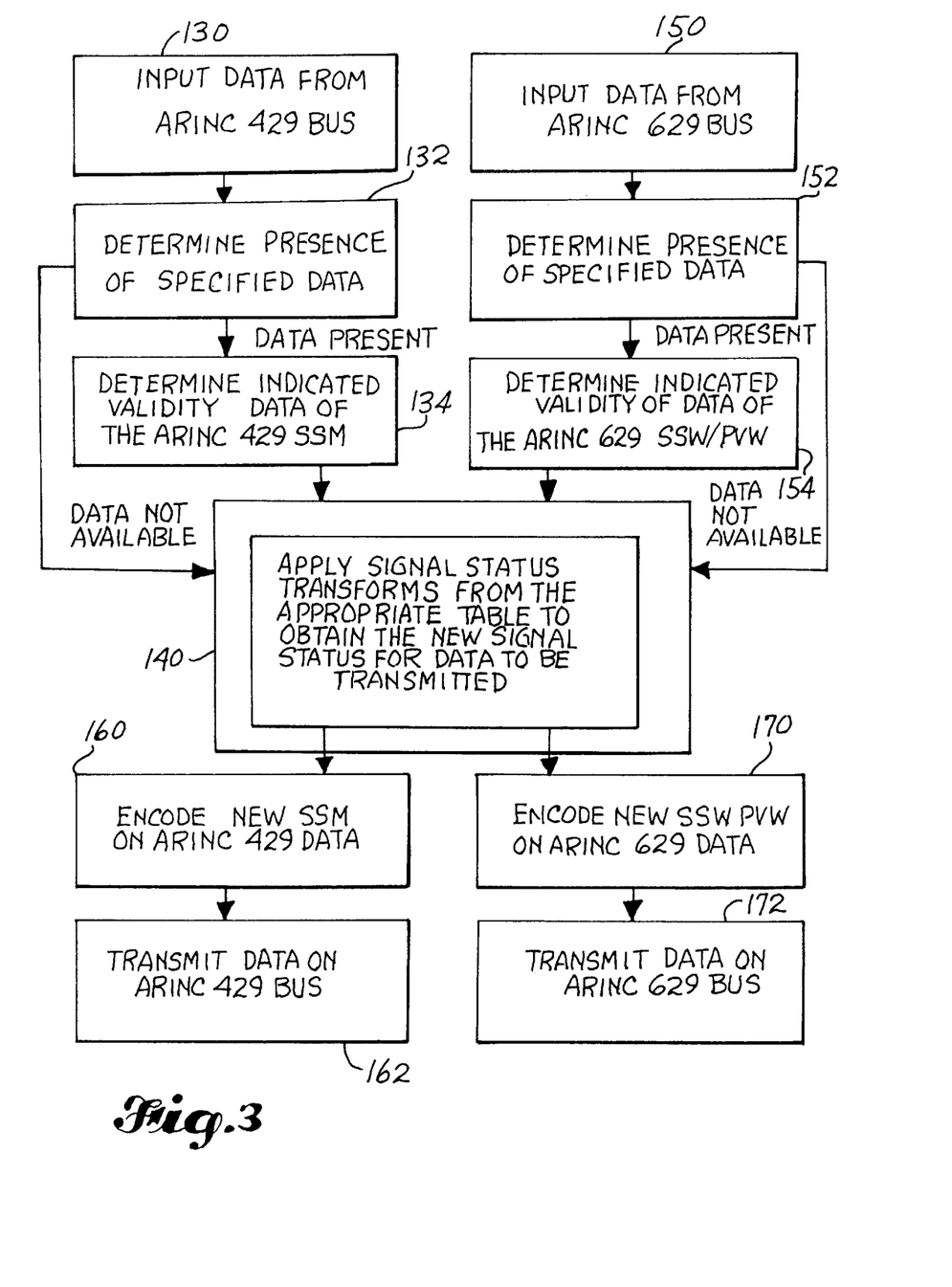

FIG. 3 is a logic flow diagram illustrating the various logical steps performed by the data conversion gateway function 180 as shown in FIG. 2.

Here, at 130, the system inputs data from an ARINC 429 data bus. Then, at 132, the system determines the presence of specified data. If the data is present, the system increments to 134 and determines the indicated validity data of the ARINC 429 sign status matrix, as set forth in the specification for ARINC 429. If, on the other hand, data is not available out of block 132, the system increments to block 140 to apply a signal status transform from an appropriate table (as described below), to obtain the new signal status for the data to be transmitted.

At block 150, the system inputs data from the ARINC 629 data bus. At block 152, the system determines the presence of specified data. If the data is determined to be present, the system increments to block 154 to determine the indicated validity of the data for the ARINC 629 system status word/parameter validity word, as set forth in the ARINC 629 specification.

If, at block 152, it is determined the data is not available, the system increments to block 140 to apply signal status transforms from the appropriate table to obtain the new signal status for the data to be transmitted.

Out of block 140, the system encodes a new sign status matrix for ARINC 429 data to be transmitted over the new ARINC 429 data bus at block 160. The system then increments to transmit the data onto the appropriate ARINC 429 data bus at block 162.

Out of block 140, in the event ARINC 629 data is to be transmitted, block 170 is entered and a new system status word, and a parameter validity word is applied to the ARINC 629 data. The system then increments to block 172 wherein the data is then transmitted on the appropriate ARINC 629 data bus.

The signal status transforms from the appropriate table are applied to obtain the new signal status for data to be transmitted, at block 140, utilizing transforms which are defined by the following tables to accomplish the indicated data conversion.

For data that is received via an ARINC 429 data bus and is to be re-transmitted by the DCGF via another ARINC 429 data bus, the DCGF transmits parameter status information in the form of a sign status matrix per the mapping set forth in the following tables:

TABLE 1A

ARINC 429 BNR TO ARINC 429 BNR STATUS TRANSLATION

| Source SSM | DCGF Status | Output SSM |
|---|---|---|
| Normal | Normal | Normal |
| Fail Warn | Normal | Fail Warn |
| NCD | Normal | NCD |
| Funct. Test | Normal | Funct. Test |
| Inactive | Normal | NCD |
| Don't Care | Fail Warn | No Transmit |
| Don't Care | Funct. Test | No Transmit |
| Don't Care | Init. | No Transmit |

TABLE 1B

ARINC 429 BCD TO ARINC 429 BCD STATUS TRANSLATION

| Source SSM | DCGF Status | Output SSM |
|---|---|---|
| Plus, North . . . | Normal | Plus, North . . . |
| Minus, South . . . | Normal | Minus, South . . . |
| NCD | Normal | NCD |
| Funct. Test | Normal | Funct. Test |
| Inactive | Normal | NCD |
| Don't Care | Fail Warn | No Transmit |
| Don't Care | Funct. Test | No Transmit |
| Don't Care | Init. | No Transmit |

TABLE 1C

ARINC 429 DISCRETE TO ARINC 429 DISCRETE STATUS TRANSLATION

| Source SSM | DCGF Status | Output SSM |
|---|---|---|
| Normal/Verified | Normal | Normal/Verified |
| NCD | Normal | NCD |
| Funct. Test | Normal | Funct. Test |
| Fail Warn | Normal | Fail Warn |
| Inactive | Normal | NCD |
| Don't Care | Fail Warn | No Transmit |
| Don't Care | Funct. Test | No Transmit |
| Don't Care | Init. | No Transmit |

With respect to the preceding tables, "NCD" indicates "No computed data"; and in the following tables, "Red.Mgmt." indicates "redundancy management".

For data that is received via an ARINC 629 data bus and is to be re-transmitted by the DCGF via an ARINC 429 data bus, the DCGF transmits parameter status information in the form of a sign status matrix per the mapping in the tables following below:

TABLE 2A

ARINC 629 BNR TO ARINC 429 BNR STATUS TRANSLATION

| Source SSW | Source PVB | DCGF Status | Output SSM |
|---|---|---|---|
| Normal | Valid | Normal | Normal |
| Normal | Invalid | Normal | NCD |
| Fail Warn | Don't Care | Normal | Fail Warn |
| Part Fail | Valid | Normal | Normal |
| Part Fail | Invalid | Normal | Fail Warn |
| Incomp. Data | Valid | Normal | Normal |
| Incomp. Data | Invalid | Normal | NCD |
| Funct. Test | Valid | Normal | Normal |
| Funct. Test | Invalid | Normal | Funct. Test |
| Sim. Data (1) | Don't Care | Normal | NCD |
| Red. Mgmt. | Don't Care | Normal | NCD |
| Init | Don't Care | Normal | NCD |
| Inactive | Don't Care | Normal | NCD |
| Don't Care | Inactive | Normal | NCD |
| Don't Care | Don't Care | Fail Warn | No Transmit |
| Don't Care | Don't Care | Funct. Test | No Transmit |
| Don't Care | Don't Care | Init | No Transmit |

(1) The Sim. Data bit of the SSW should never be set. A wordstring received with this bit set has been corrupted and thus, is treated as Inactive.

TABLE 2B

ARINC 629 BCD TO ARINC 429 BCD STATUS TRANSLATION

| Source SSW | Source PVB | DCGF Status | Output SSM |
|---|---|---|---|
| Normal | Valid | Normal | Plus, North . . . or Minus, South . . . (1) |
| Normal | Invalid | Normal | NCD |
| Fail Warn | Valid | Normal | Plus, North . . . or Minus, South . . . (1) |
| Fail Warn | Invalid | Normal | Plus, North . . . or Minus, South . . . (1) |
| Part Fail | Valid | Normal | Plus, North . . . or Minus, South . . . (1) |
| Part Fail | Invalid | Normal | Plus, North . . . or Minus, South . . . (1) |
| Incomp. Data | Valid | Normal | Plus, North . . . or Minus, South . . . (1) |
| Incomp. Data | Invalid | Normal | NCD |

TABLE 2B-continued

ARINC 629 BCD TO ARINC 429 BCD STATUS TRANSLATION

| Source SSW | Source PVB | DCGF Status | Output SSM |
|---|---|---|---|
| Funct. Test | Valid | Normal | Plus, North . . . or Minus, South . . . (1) |
| Funct. Test | Invalid | Normal | Funct. Test |
| Sim. Data (2) | Don't Care | Normal | NCD |
| Red. Mgmt. | Don't Care | Normal | NCD |
| Init | Don't Care | Normal | NCD |
| Inactive | Don't Care | Normal | NCD |
| Don't Care | Inactive | Normal | NCD |
| Don't Care | Don't Care | Fail Warn | No Transmit |
| Don't Care | Don't Care | Funct. Test | No Transmit |
| Don't Care | Don't Care | Init | No Transmit |

(1) Where the value of the parameter cannot be determined reliably, set the corresponding BCD character codes to 1111.
(2) The Sim. Data bit of the SSW should never be set. A wordstring received with this bit set has been corrupted and thus, is treated as Inactive.

TABLE 2C

ARINC 629 DISCRETE TO ARINC 429 DISCRETE STATUS TRANSLATION

| Source SSW | Source PVB | 2 Bit Param Status | DCGF Status | Output SSM |
|---|---|---|---|---|
| Normal | Valid | Valid | Normal | Normal |
| Normal | Valid | Invalid | Normal | NCD |
| Normal | Invalid | Don't Care | Normal | NCD |
| Fail Warn | Don't Care | Don't Care | Normal | Fail Warn |
| Part Fail | Valid | Valid | Normal | Normal |
| Part Fail | Valid | Invalid | Normal | NCD |
| Part Fail | Invalid | Don't Care | Normal | Fail Warn |
| Incomp. Data | Valid | Valid | Normal | Normal |
| Incomp. Data | Valid | Invalid | Normal | NCD |
| Incomp. Data | Invalid | Don't Care | Normal | NCD |
| Funct. Test | Valid | Valid | Normal | Normal |
| Funct. Test | Valid | Invalid | Normal | NCD |
| Funct. Test | Invalid | Don't Care | Normal | Funct. Test |
| Sim. Data (1) | Don't Care | Don't Care | Normal | NCD |
| Red. Mgmt. | Don't Care | Don't Care | Normal | NCD |
| Init | Don't Care | Don't Care | Normal | NCD |
| Inactive | Don't Care | Don't Care | Normal | NCD |
| Don't Care | Inactive | Don't Care | Normal | NCD |
| Don't Care | Don't Care | Don't Care | Fail Warn | No Transmit |
| Don't Care | Don't Care | Don't Care | Funct. Test | No Transmit |
| Don't Care | Don't Care | Don't Care | Init | No Transmit |

(1) The Sim. Data bit of the SSW should never be set. A wordstring received with this bit set has been corrupted and thus, is treated as Inactive.

For data that is received via an ARINC 629 data bus and is to be re-transmitted by the DCGF via an ARINC 429 data bus, when multiple system status word bits are set simultaneously, the translation of system status information into the ARINC 429 sign status matrix shall be according to the following order of priority (where 1 is the highest priority):

1. Initialization,
2. Failure Warn,
3. Redundancy Management,
4. Functional Test,
5. Simulated Data,
6. Partial Failure, and
7. Incomplete Data.

For data that is received via an ARINC 429 data bus and is to be re-transmitted by the DCGF via an ARINC 629 data bus, the DCGF shall transmit source system and parameter status information in the form of a Refresh Counter, parameter validity word, and system status word per the mapping set forth in the following tables:

TABLE 3A

ARINC 429 BNR TO ARINC 629 BNR STATUS TRANSLATION

| Input SSM | DCGF Status | Output Source SSW | Output PVB | Output Refresh Cntr |
|---|---|---|---|---|
| Normal | Normal | Normal | Valid | Updated |
| Fail Warn | Normal | Part Fail | Invalid | Updated |
| NCD | Normal | Incomp. Data | Invalid | Updated |
| Funct. Test | Normal | Funct. Test | Invalid | Updated |
| Inactive | Normal | Incomp. Data | Invalid | Updated |
| Don't Care | Fail Warn | Not Updated | Not Updated | Not Update |
| Don't Care | Funct. Test | Not Updated | Not Updated | Not Updated |
| Don't Care | Init | Init | Not Updated | Not Updated |

TABLE 3B

ARINC 429 BCD TO ARINC 629 BCD STATUS TRANSLATION

| Input SSM | DCGF Status | Output Source SSW | Output PVB | Output Refresh Cntr |
|---|---|---|---|---|
| Plus, North . . . | Normal | Normal | Valid | Updated |
| Plus, North . . . (1) | Normal | Part Fail | Invalid | Updated |
| Minus, South . . . | Normal | Normal | Valid | Updated |
| Minus, South . . . (1) | Normal | Part Fail | Invalid | Updated |
| NCD | Normal | Incomp. Data | Invalid | Updated |
| Funct. Test | Normal | Funct. Test | Invalid | Updated |
| Inactive | Normal | Incomp. Data | Invalid | Updated |
| Don't Care | Fail Warn | Not Updated | Not Updated | Not Updated |
| Don't Care | Funct. Test | Not Updated | Not Updated | Not Updated |
| Don't Care | Init | Init | Not Updated | Not Updated |

(1) When the BCD character codes are set to 1111 . . . , indicating the value of the parameter cannot be determined reliably.

TABLE 3C

ARINC 429 DISCRETE TO ARINC 629 DISCRETE STATUS TRANSLATION

| Input SSM | DCGF Status | Output Source SSW | Output PVB | Output Refresh Cntr |
|---|---|---|---|---|
| Normal/ Verified | Normal | Normal | Valid | Updated |
| Fail Warn | Normal | Part Fail | Invalid | Updated |
| NCD | Normal | Incomp. Data | Invalid | Updated |
| Funct. Test | Normal | Funct. Test | Invalid | Updated |
| Inactive | Normal | Incomp. Data | Invalid | Updated |
| Don't Care | Fail Warn | Not Updated | Not Updated | Not Updated |
| Don't Care | Funct. Test | Not Updated | Not Updated | Not Updated |
| Don't Care | Init | Init | Not Updated | Not Updated |

For data that is received via an ARINC 629 data bus and is to be re-transmitted by the DCGF via another ARINC 629 data bus, the DCGF shall transmit source system and parameter status information in the form of a Refresh Counter, parameter validity word, and system status word per the mapping given in the following table:

TABLE 4

ARINC 629 TO ARINC 629 STATUS TRANSLATION

| Source SSW | Source PVB | DCGF Status | Output SSW | Output PVB | Output Refresh Cntr |
|---|---|---|---|---|---|
| Normal | Valid | Normal | Normal | Valid | Updated |
| Normal | Invalid | Normal | Normal | Invalid | Updated |
| Fail Warn | Don't Care | Normal | Fail Warn | Invalid (1) | Updated |
| Part Fail | Valid | Normal | Part Fail | Valid | Updated |
| Part Fail | Invalid | Normal | Part Fail | Invalid | Updated |
| Incomp. Data | Valid | Normal | Incomp. Data | Valid | Updated |
| Incomp. Data | Invalid | Normal | Incomp. Data | Invalid | Updated |
| Funct. Test | Valid | Normal | Funct. Test | Valid | Updated |
| Funct. Test | Invalid | Normal | Funct. Test | Invalid | Updated |
| Sim. Data | Don't Care | Normal | Sim. Data | Invalid | Updated |
| Red. Mgmt. | Don't Care | Normal | Red. Mgmt. | Invalid (2) | Updated |
| Init. | Don't Care | Normal | Init. | Invalid | Updated |
| Inactive | Don't Care | Normal | Incomp. Data | Invalid | Updated |
| Don't Care | Inactive | Normal | Incomp. Data | Invalid | Updated |
| Don't Care | Don't Care | Fail Warn | Not Updated | Not Updated | Not Updated |
| Don't Care | Don't Care | Funct. Test | Not Updated | Not Updated | Not Updated |
| Don't Care | Don't Care | Init. | Init | Not Updated | Not Updated |

(1) Set PVBs to INVALID for ALL parameters associated with this source when the source LRU SSW = Fail Warn.
(2) Set PVBs to INVALID for ALL parameters associated with this source when the source LRU SSW = Red. Mgmt.

Where the DCGF selects from among multiple redundant sources of a parameter to produce a single output parameter, the source status indicators that are transmitted by the DCGF (i.e., Refresh Counter, system status word, and parameter validity word for ARINC 629 output; sign status matrix for ARINC 429 outputs) shall indicate the status of the source whose value was selected for retransmission.

Note that each data source is characterized by a particular system position, transmitter channel and bus. Redundant sources differ in one or more of these attributes.

For each wordstring that is received via an ARINC 629 data bus and is cyclic redundancy checked, if the cyclic redundancy check fails, then all data within that wordstring are treated as Inactive.

Note that a data item is considered "Inactive" in the event of any condition that prevents a freshly computed value for that item from being available to the DCGF. Various external and internal conditions can cause "Inactive" data. The cyclic redundancy check is a method for detecting some of these faults.

For data that are received via an intermediate gateway, if the intermediate gateway has been determined to be failed such that some or all of its outputs are rendered unreliable, the DCGF shall indicate the status of the source system and corresponding parameters in the same manner as if the source system became Inactive.

For each group of data received by the DCGF from the same ARINC 429 input bus and re-transmitted by the DCGF via ARINC 629 data buses, the DCGF shall compute a system status word based upon the sign status matrices in each of the received labels. The sign status matrix states shall be assigned the following order of priority; and the sign status matrix with the highest priority among the set of input label sign status matrices shall be converted to the system status word:

1. SSM=Failure Warning and SSM Type (as specified in the ICD)=BNR
   or SSM=Plus, North, etc. and SSM Type=BCD and at least 1 BCD character code set to all 1's
   or SSM=Minus, South, etc. and SSM Type BCD and at least 1 BCD character code set to all 1's
2. SSM=Functional Test
3. SSM=NCD or Inactive
4. SSM=Normal and SSM Type=BNR
   or SSM=Normal/Verified and SSM Type=DIS
   or SSM=Plus, North, etc. and SSM Type=BCD and none of the BCD character codes are set to all 1's
   or SSM=Minus, South, etc. and SSM Type=BCD and none of the BCD character codes are set to all 1's In summary, a method and apparatus for an avionics system utilizing both ARINC 429 and ARINC 629 compliant systems has been disclosed. While preferred embodiment of the invention has been described in detail, it should be understood that many modifications and variations thereto are possible, all of which fall within the true spirit and scope of the invention.

What is claimed is:

1. An aircraft avionics system utilizing Aeronautical Radio, Inc. (ARINC) standard equipment comprising:

an ARINC 429 compliant data bus;

at least one ARINC 429 compliant avionics system coupled to said ARINC 429 bus;

an ARINC 629 compliant data bus;

at least one ARINC 629 compliant avionics system coupled to said ARINC 629 data bus; and a data conversion gateway function (DCGF) system including logic means for converting a signal produced by said ARINC 429 compliant avionics system on said ARINC 429 data bus for transmission over said ARINC 629 data bus to said ARINC 629 compliant avionics system.

2. The aircraft avionics system of claim 1, wherein said DCGF logic means further comprises means for converting a signal produced by said ARINC 629 compliant avionics system on said ARINC 629 data bus for transmission over said ARINC 429 data bus to said ARINC 429 compliant avionics system.

3. The aircraft avionics system of claim 1 further comprising:

a second ARINC 429 compliant data bus;

at least one ARINC 429 compliant avionics system coupled to said second ARINC 429 data bus; and said DCGF system logic means further comprising means for converting a signal produced by said at least one ARINC 429 compliant avionics system on said ARINC 429 data bus for transmission over said second ARINC 429 data bus to said at least one ARINC 429 system coupled thereto.

4. The aircraft avionics system of claim 2 further comprising:

a second ARINC 429 compliant data bus;

at least one ARINC 429 compliant avionics system coupled to said second ARINC 429 data bus; and said DCGF system logic means further comprising means for converting a signal produced by said at least one ARINC 429 compliant avionics system on said ARINC 429 data bus for transmission over said second ARINC 429 data bus to said at least one ARINC 429 system coupled thereto.

5. The aircraft avionics system of claim 1 further comprising:
a second ARINC 629 compliant data bus;
at least one ARINC 629 compliant avionics system coupled to said second ARINC 629 data bus; and
said DCGF system logic means further comprising means for converting a signal produced by said at least one ARINC 629 compliant avionics system on said ARINC 629 data bus for transmission over said second ARINC 629 data bus to said at least one ARINC 629 system coupled thereto.

6. The aircraft avionics system of claim 2 further comprising:
a second ARINC 629 compliant data bus;
at least one ARINC 629 compliant avionics system coupled to said second ARINC 629 data bus; and
said DCGF system logic means further comprising means for converting a signal produced by said at least one ARINC 629 compliant avionics system on said ARINC 629 data bus for transmission over said second ARINC 629 data bus to said at least one ARINC 629 system coupled thereto.

7. The aircraft avionics system of claim 3 further comprising:
a second ARINC 629 compliant data bus;
at least one ARINC 629 compliant avionics system coupled to said second ARINC 629 data bus; and
said DCGF system logic means further comprising means for converting a signal produced by said at least one ARINC 629 compliant avionics system on said ARINC 629 data bus for transmission over said second ARINC 629 data bus to said at least one ARINC 629 system coupled thereto.

8. The aircraft avionics system of claim 4 further comprising:
a second ARINC 629 compliant data bus;
at least one ARINC 629 compliant avionics system coupled to said second ARINC 629 data bus; and
said DCGF system logic means further comprising means for converting a signal produced by said at least one ARINC 629 compliant avionics system on said ARINC 629 data bus for transmission over said second ARINC 629 data bus to said at least one ARINC 629 system coupled thereto.

9. An aircraft avionics system utilizing Aeronautical Radio, Inc. (ARINC) standard equipment comprising:
an ARINC 429 compliant data bus;
at least one ARINC 429 compliant avionics system coupled to said ARINC 429 bus;
an ARINC 629 compliant data bus;
at least one ARINC 629 compliant avionics system coupled to said ARINC 629 data bus; and
a data conversion gateway function (DCGF) system including logic means for converting a signal produced by said ARINC 629 compliant avionics system on said ARINC 629 data bus for transmission over said ARINC 429 data bus to said ARINC 429 compliant avionics system.

10. The aircraft avionics system of claim 9, wherein said DCGF logic means further comprises means for converting a signal produced by said ARINC 429 compliant avionics system on said ARINC 429 data bus for transmission over said ARINC 629 data bus to said ARINC 629 compliant avionics system.

11. The aircraft avionics system of claim 9 further comprising:
a second ARINC 429 compliant data bus;
at least one ARINC 429 compliant avionics system coupled to said second ARINC 429 data bus; and
said DCGF system logic means further comprising means for converting a signal produced by said at least one ARINC 429 compliant avionics system on said ARINC 429 data bus for transmission over said second ARINC 429 data bus to said at least one ARINC 429 system coupled thereto.

12. The aircraft avionics system of claim 10 further comprising:
a second ARINC 429 compliant data bus;
at least one ARINC 429 compliant avionics system coupled to said second ARINC 429 data bus; and
said DCGF system logic means further comprising means for converting a signal produced by said at least one ARINC 429 compliant avionics system on said ARINC 429 data bus for transmission over said second ARINC 429 data bus to said at least one ARINC 429 system coupled thereto.

13. The aircraft avionics system of claim 9 further comprising:
a second ARINC 629 compliant data bus;
at least one ARINC 629 compliant avionics system coupled to said second ARINC 629 data bus; and
said DCGF system logic means further comprising means for converting a signal produced by said at least one ARINC 629 compliant avionics system on said ARINC 629 data bus for transmission over said second ARINC 629 data bus to said at least one ARINC 629 system coupled thereto.

14. The aircraft avionics system of claim 10 further comprising:
a second ARINC 629 compliant data bus;
at least one ARINC 629 compliant avionics system coupled to said second ARINC 629 data bus; and
said DCGF system logic means further comprising means for converting a signal produced by said at least one ARINC 629 compliant avionics system on said ARINC 629 data bus for transmission over said second ARINC 629 data bus to said at least one ARINC 629 system coupled thereto.

15. The aircraft avionics system of claim 11 further comprising:
a second ARINC 629 compliant data bus;
at least one ARINC 629 compliant avionics system coupled to said second ARINC 629 data bus; and
said DCGF system logic means further comprising means for converting a signal produced by said at least one ARINC 629 compliant avionics system on said ARINC 629 data bus for transmission over said second ARINC 629 data bus to said at least one ARINC 629 system coupled thereto.

16. The aircraft avionics system of claim 12 further comprising:
a second ARINC 629 compliant data bus;
at least one ARINC 629 compliant avionics system coupled to said second ARINC 629 data bus; and said DCGF system logic means further comprising means for converting a signal produced by said at least one ARINC 629 compliant avionics system on said ARINC 629 data bus for transmission over said second ARINC 629 data bus to said at least one ARINC 629 system coupled thereto.

17. In an aircraft avionics system utilizing Aeronautical Radio, Inc. (ARINC) standard 429 and 629 compliant equipment, a method for providing communication among such equipment comprising the steps of:

providing an ARINC 429 compliant data bus;

providing at least one ARINC 429 compliant avionics system coupled to said ARINC 429 data bus;

providing an ARINC 629 compliant data bus;

providing at least one ARINC 629 compliant avionics system coupled to said ARINC 629 data bus; and providing a data conversion gateway function (DCGF) system including logic means for performing the step of converting a signal produced by said ARINC 429 compliant avionics system on said ARINC 429 data bus for transmission over said ARINC 629 data bus to said ARINC 629 compliant avionics system.

18. The aircraft avionics system of claim 17 wherein said DCGF logic means further performs the step of converting a signal produced by said ARINC 629 compliant avionics system on said ARINC 629 data bus for transmission over said ARINC 429 data bus to said ARINC 429 compliant avionics system.

19. The method of claim 17 including the further steps of:

providing a second ARINC 429 compliant data bus;

providing at least one ARINC 429 compliant avionics system coupled to said second ARINC 429 data bus; and said DCGF system logic means further performing the step of converting a signal produced by said at least one ARINC 429 compliant avionics system on said ARINC 429 data bus for transmission over said second ARINC 429 data bus to said at least one ARINC 429 system coupled thereto.

20. The method of claim 18 including the further steps of:

providing a second ARINC 429 compliant data bus;

providing at least one ARINC 429 compliant avionics system coupled to said second ARINC 429 data bus; and said DCGF system logic means further performing the step of converting a signal produced by said at least one ARINC 429 compliant avionics system on said ARINC 429 data bus for transmission over said second ARINC 429 data bus to said at least one ARINC 429 system coupled thereto.

21. The method of claim 17 comprising the furthers steps of:

providing a second ARINC 629 compliant data bus;

providing at least one ARINC 629 compliant avionics system coupled to said second ARINC 629 data bus; and wherein said DCGF system logic performs the further step of converting a signal produced by said at least one ARINC compliant avionics system on said ARINC 629 data bus for transmission over said second ARINC 629 data bus to said at least one ARINC 629 system coupled thereto.

22. The method of claim 18 comprising the furthers steps of:

providing a second ARINC 629 compliant data bus;

providing at least one ARINC 629 compliant avionics system coupled to said second ARINC 629 data bus; and wherein said DCGF system logic performs the further step of converting a signal produced by said at least one ARINC compliant avionics system on said ARINC 629 data bus for transmission over said second ARINC 629 data bus to said at least one ARINC 629 system coupled thereto.

23. The method of claim 19 comprising the furthers steps of:

providing a second ARINC 629 compliant data bus;

providing at least one ARINC 629 compliant avionics system coupled to said second ARINC 629 data bus; and wherein said DCGF system logic performs the further step of converting a signal produced by said at least one ARINC compliant avionics system on said ARINC 629 data bus for transmission over said second ARINC 629 data bus to said at least one ARINC 629 system coupled thereto.

24. The method of claim 20 comprising the furthers steps of:

providing a second ARINC 629 compliant data bus;

providing at least one ARINC 629 compliant avionics system coupled to said second ARINC 629 data bus; and wherein said DCGF system logic performs the further step of converting a signal produced by said at least one ARINC compliant avionics system on said ARINC 629 data bus for transmission over said second ARINC 629 data bus to said at least one ARINC 629 system coupled thereto.

25. In an aircraft avionics system utilizing Aeronautical Radio, Inc. (ARINC) standard 429 and 629 compliant equipment, a method for providing communication among such equipment comprising the steps of:

providing an ARINC 429 compliant data bus;

providing at least one ARINC 429 compliant avionics system coupled to said ARINC 429 data bus;

providing an ARINC 629 compliant data bus;

providing at least one ARINC 629 compliant avionics system coupled to said ARINC 629 data bus; and providing a data conversion gateway function (DCGF) system including logic means for performing the step of: converting a signal produced by said ARINC 629 compliant avionics system on said ARINC 629 data bus for transmission over said ARINC 429 data bus to said ARINC 429 compliant avionics system.

26. The method of claim 25 wherein said DCGF logic means performs the further step of converting a signal produced by said ARINC 429 compliant avionics system on said ARINC 429 data bus for transmission over said ARINC 629 data bus to said ARINC 629 compliant avionics system.

27. The method of claim 25 comprising the further steps of:

providing a second ARINC 429 compliant data bus;

providing at least one ARINC 429 compliant avionics system coupled to said second ARINC 429 data bus; and said DCGF system logic means further performing the step of converting a signal produced by said at least one ARINC 429 compliant avionics system on said ARINC 429 data bus for transmission over said second ARINC 429 data bus to said at least one ARINC 429 system coupled thereto.

28. The method of claim 26 comprising the further steps of:

providing a second ARINC 429 compliant data bus;

providing at least one ARINC 429 compliant avionics system coupled to said second ARINC 429 data bus; and said DCGF system logic means further performing the step of converting a signal produced by said at least one ARINC 429 compliant avionics system on said ARINC 429 data bus for transmission over said second ARINC 429 data bus to said at least one ARINC 429 system coupled thereto.

29. The method of claim 25 including the further steps of:

providing a second ARINC 629 compliant data bus;

providing at least one ARINC 629 compliant avionics system coupled to said second ARINC 629 data bus; and wherein said DCGF system logic means performs the further step of converting a signal produced by said at least one ARINC compliant avionics system on said ARINC 629 data bus for transmission over said second ARINC 629 data bus to said at least one ARINC 629 system coupled thereto.

30. The method of claim 26 including the further steps of:

providing a second ARINC 629 compliant data bus;

providing at least one ARINC 629 compliant avionics system coupled to said second ARINC 629 data bus; and wherein said DCGF system logic means performs the further step of converting a signal produced by said at least one ARINC compliant avionics system on said ARINC 629 data bus for transmission over said second ARINC 629 data bus to said at least one ARINC 629 system coupled thereto.

31. The method of claim 27 including the further steps of:

providing a second ARINC 629 compliant data bus;

providing at least one ARINC 629 compliant avionics system coupled to said second ARINC 629 data bus; and wherein said DCGF system logic means performs the further step of converting a signal produced by said at least one ARINC compliant avionics system on said ARINC 629 data bus for transmission over said second ARINC 629 data bus to said at least one ARINC 629 system coupled thereto.

32. The method of claim 28 including the further steps of:

providing a second ARINC 629 compliant data bus;

providing at least one ARINC 629 compliant avionics system coupled to said second ARINC 629 data bus; and wherein said DCGF system logic means performs the further step of converting a signal produced by said at least one ARINC compliant avionics system on said ARINC 629 data bus for transmission over said second ARINC 629 data bus to said at least one ARINC 629 system coupled thereto.

* * * * *